United States Patent
Dent et al.

(10) Patent No.: US 9,432,319 B2
(45) Date of Patent: Aug. 30, 2016

(54) METHOD, SYSTEM AND APPARATUS FOR AUTOMATICALLY GENERATING DISTRIBUTION LISTS

(71) Applicant: RESEARCH IN MOTION LIMITED, Waterloo (CA)

(72) Inventors: Terrill Mark Dent, Waterloo (CA); Gregory Robertson Bentz, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 385 days.

(21) Appl. No.: 13/787,959

(22) Filed: Mar. 7, 2013

(65) Prior Publication Data
US 2014/0258420 A1 Sep. 11, 2014

(51) Int. Cl.
*H04L 12/58* (2006.01)

(52) U.S. Cl.
CPC ............... *H04L 51/14* (2013.01); *H04L 51/28* (2013.01)

(58) Field of Classification Search
CPC .............................. H04L 51/14; H04L 51/28
USPC ....................................................... 709/206
See application file for complete search history.

(56) References Cited

U.S. PATENT DOCUMENTS

| | | | |
|---|---|---|---|
| 6,704,772 B1* | 3/2004 | Ahmed et al. | 709/207 |
| 7,315,986 B2 | 1/2008 | Gonzalez | |
| 8,416,727 B2 | 4/2013 | LoGalbo | |
| 2006/0143277 A1 | 6/2006 | Bauchot et al. | |
| 2007/0050456 A1* | 3/2007 | Vuong et al. | 709/206 |
| 2010/0332975 A1 | 12/2010 | Chang et al. | |
| 2011/0099239 A1 | 4/2011 | Buchheit | |
| 2011/0225254 A1* | 9/2011 | Atkins et al. | 709/206 |

OTHER PUBLICATIONS

Oda, Terri (with sections by Warsaw, Barry A.); GNU Mailman—List Member Manual; Mar. 2, 2015; www.gnu.org; Release 2.1; Sections 5 and 9 (Excerpts); 7 pages.*
Timeline: GNU Mailman; Apr. 30, 2015; https://launchpad.net/mailman/+series; 2 pages.*
Sapiro, Mark; [Mailman-Users] simple option to unsubscribe from list viaemail or single click; Apr. 7, 2011; Mailman-Users mailing list; 1 page.*
puff; DOC/Making Sure Your Lists Are Private; May 18, 2010; Mailman Wiki; 6 pages.*
Create an E-Mail Distribution List, Dec. 26, 2007, technet. microsoft.com (1 page).*
Sympa 6.2 Reference Manual—Table of Contents, Aug. 28, 2009, sympa.org (15 Pages).*
Sympa 6.2 Reference Manual—List creation, editing and removal, Apr. 30, 2015, sympa.org (8 pages).*
Aumont et al., Sympa 5.2.3 Manual (Excerpt), Oct. 20, 2006, sympa.org (20 pages).*
Corresponding European Patent Application No. 13158115.9 Search Report dated Jun. 28, 2013.
Managing Mailing List Subscriptions downloaded Feb. 12, 2013 http://www.w3.org/Mail/Request.
Electronic Mailing List downloaded Feb. 12, 2013 http://en.wikipedia.org/wiki/Electronic_mailing_list.
Distribution List Manager downloaded Feb. 12, 2013 http://www.activatelive.com/Product/Distribution-List-Management.aspx.

* cited by examiner

*Primary Examiner* — Brendan Higa
*Assistant Examiner* — Leon Y Tseng
(74) *Attorney, Agent, or Firm* — Perry + Currier, Inc.

(57) ABSTRACT

A method, system and apparatus for automatically generating distribution lists are provided. In response to receiving, using a communication interface of a device comprising a processor and the communication interface, a message comprising a given identifier, a distribution list is automatically generated at the processor, the distribution list comprising at least one network address associated with the message.

14 Claims, 15 Drawing Sheets

METHOD, SYSTEM AND APPARATUS FOR AUTOMATICALLY GENERATING DISTRIBUTION LISTS

FIELD

The specification relates generally to messaging servers, and specifically to a method, system and apparatus for automatically generating distribution lists.

BACKGROUND

The evolution of computers is currently quite active in the communication device environment. It is now well-known to include calendaring, contacts, and messaging functions in communication devices. More recently, there has been a veritable explosion of the number and type of applications that are configured to the unique form factors and computing environments of communication devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
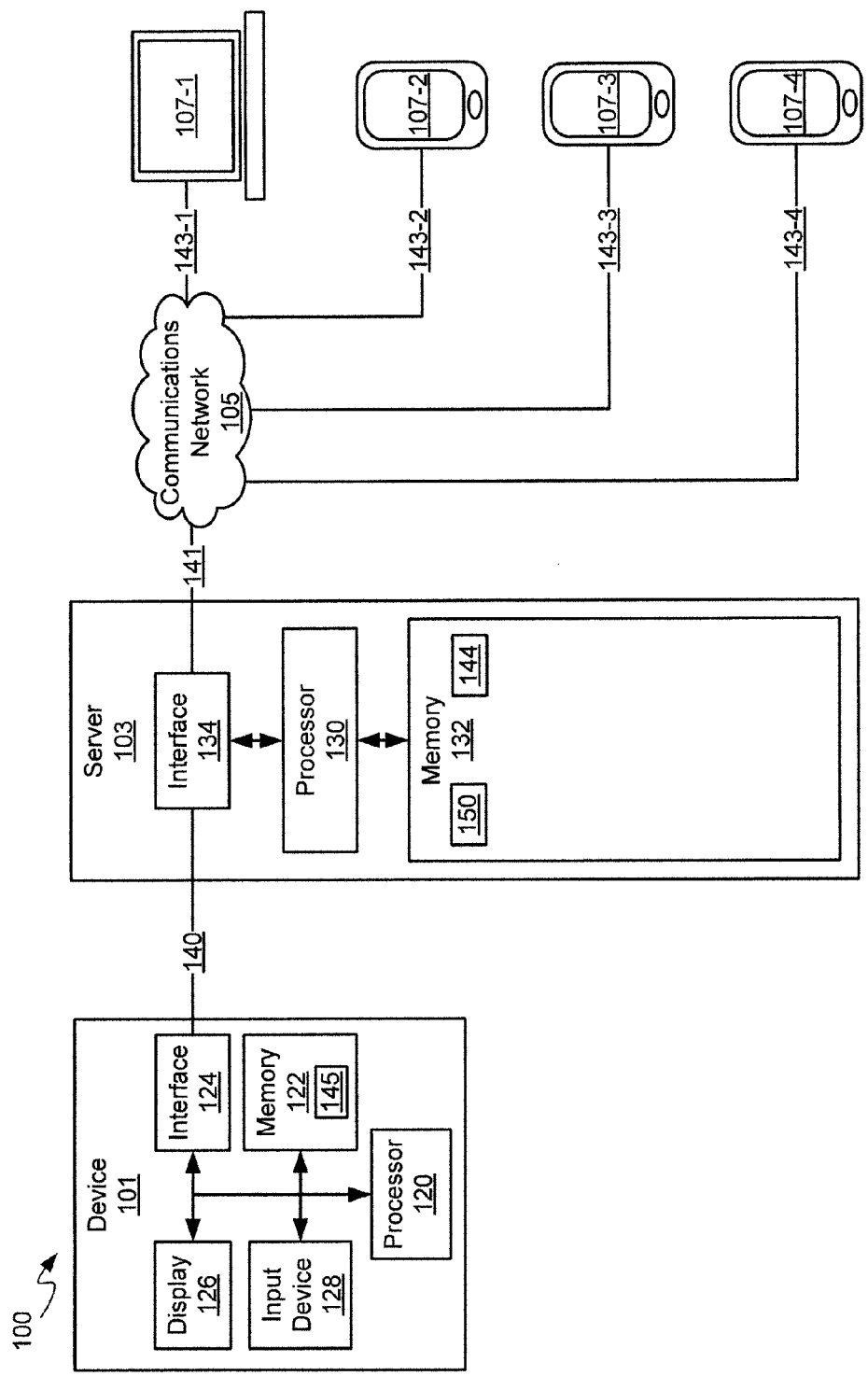
FIG. 1 depicts a system for automatically generating distribution lists, according to non-limiting implementations.

In this specification, elements may be described as "configured to" perform one or more functions or "configured for" such functions. In general, an element that is configured to perform or configured for performing a function is configured to perform the function, or is enabled to perform the function, or is suitable for performing the function, or is adapted to perform the function, or is operable to perform the function, or is otherwise capable of performing the function.

An aspect of the specification provides a device comprising: a processor, and a communication interface, the processor configured to: in response to receiving, using the communication interface, a message comprising a given identifier, automatically generate a distribution list comprising at least one network address associated with the message.

The processor can be further configured to name the distribution list.

The processor can be further configured to name the distribution list using a name received with the given identifier.

The message can be addressed to an other network address different from the at least one network address, the other network address comprising the given identifier. A local part of the other network address can comprise the given identifier. A local part of the other network address can comprise the given identifier and a name of the distribution list.

The processor can be further configured to: transmit, using the communication interface, a notification message notifying that the distribution list was generated to one or more of: the at least one network address; and, a device from which the message was received. The notification message can further comprise a link for one or more of: unsubscribing from the distribution list; and, editing the distribution list.

The processor can be further configured to: receive, using the communication interface, an other message addressed to the distribution list; and, forward the other message to the network addresses on the distribution list only when the other message is received from one or more of: a network address on the distribution list; and, a network address comprising a domain part associated with the distribution list.

The processor can be further configured to: receive, using the communication interface, an other message addressed to the distribution list; and, forward the other message to the network addresses on the distribution list only when the other message can comprise a given keyword.

Another aspect of the specification provides a method comprising: in response to receiving, using a communication interface of a device comprising a processor and the communication interface, a message comprising a given identifier, automatically generating, at the processor, a distribution list comprising at least one network address associated with the message.

The method can further comprise naming the distribution list.

The method can further comprise naming the distribution list using a name received with the given identifier.

The message can be addressed to an other network address different from the at least one network address, the other network address comprising the given identifier. A local part of the other network address can comprise the given identifier. A local part of the other network address can comprise the given identifier and a name of the distribution list.

The method can further comprise: transmitting, using the communication interface, a notification message notifying that the distribution list was generated to one or more of: the at least one network address; and, a device from which the message was received. The notification message can further comprise a link for one or more of: unsubscribing from the distribution list; and, editing the distribution list.

The method can further comprise: receiving, using the communication interface, an other message addressed to the distribution list; and, forwarding the other message to the network addresses on the distribution list only when the other message is received from one or more of: a network address on the distribution list; and, a network address comprising a domain part associated with the distribution list.

The method can further comprise: receiving, using the communication interface, an other message addressed to the distribution list; and, forwarding the other message to the network addresses on the distribution list only when the other message can comprise a given keyword.

Yet a further aspect of the specification provides a computer program product, comprising a computer usable medium having a computer readable program code adapted to be executed to implement a method comprising: in response to receiving, using a communication interface of a device comprising a processor and the communication interface, a message comprising a given identifier, automatically generating, at the processor, a distribution list comprising at least one network address associated with the message. The computer usable medium can comprise a non-transitory computer usable medium.

FIG. 1 depicts a system 100 for automatically generating distribution lists, according to non-limiting implementations. System 100 generally comprises a device 101, a server 103, at least one communications network 105, and devices 107-1, 107-2, 107-3, 107-4, according to non-limiting implementations. The at least one communications network 105 will be interchangeably referred to hereafter as network 105. Devices 107-1, 107-2, 107-3, 107-4 will be interchangeably referred to hereafter, collectively, as devices 107 and generically as a device 107. Device 101 comprises a processor 120 interconnected with a memory 122, a communications interface 124 (interchangeably referred to hereafter as interface 124), a display 126 and an input device 128, and optionally a microphone and speaker (not depicted). Server 103 comprises a processor 130 interconnected with a memory 132, and a communications interface 134 (interchangeably referred to hereafter as interface 134). It is further appreciated that device 101 and server 103 communicate using respective interfaces 124, 134 and a link 140 between device 101 and server 103. It is further appreciated that server 103 and devices 107 communicate using interface 134, a link 141 between server 103 and network 105, and respective links 143-1, 143-2, 143-3, 143-4 between devices 107 and network 105. Links 143-1, 143-2, 143-3, 143-4 will be interchangeably referred to hereafter, collectively, as links 143 and generically as a link 143.

In any event, as will presently be described, processor 130 of server 103 is generally configured to: in response to receiving, using interface 134, a message comprising a given identifier 144, automatically generate a distribution list comprising at least one network address associated with the message. Given identifier 144 can be stored at memory 132 such that a message can be compared with given identifier 144 to determine whether the message comprises given identifier 144. For example, processor 130 can receive an email from device 101 that is addressed to a network address comprising given identifier 144, and optionally at least one network address of one or more of devices 107; server 103 will recognize the network address comprising given identifier 144 as a trigger for generating a distribution list comprising the network addresses of device 101 and devices 107 to which the message was also addressed, by comparing the network address to given identifier 144 stored at server 103.

Device 101 can be any type of electronic device that can be used in a self-contained manner to process a messaging application 145 stored, for example, at memory 122. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Similarly, each of devices 107 can be any type of electronic device that can be used in a self-contained manner to process a respective messaging application, similar to messaging application 145, stored, for example, at respective memories. Each device 107 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Further, while only four devices 107 are depicted, system 100 can comprise any number of devices 107, including, but not limited to, one device 107, hundreds of devices 107, millions of devices 107 and above.

Server 103 can be any type of server that can be used to process a message handling application 150 stored, for example, at memory 132. Server 130 is generally configured to handle messages for device 101 hence; server 103 can include, but is not limited to, a mail server, a messaging server, a proxy server and the like. Server 103 can otherwise be based on any well-known server environment including a module that houses one or more central processing units (i.e. processor 130 comprises one or more central processing units), volatile memory (e.g. random access memory), persistent memory (e.g. hard disk devices) (i.e. memory 132 comprises volatile memory and persistent memory) and network interfaces (i.e. interface 134 comprises one or more network interfaces) to allow server 103 to communicate over links 140, 141. For example, server 103 can comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely exemplary, and a vast array of other types of computing environments for server 103 are contemplated. It is further more appreciated that server 103 can comprise any suitable number of servers that can perform different functionality of server implementations described herein.

Link 140 comprises any suitable link for enabling device 101 and server 103 to communicate. Similarly, link 141 comprises any suitable link for enabling server 103 to communicate with network 105. Similarly, links 143 comprises any suitable links for enabling devices 107 to communicate with network 105. Links 140, 141, 143 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely an example, and contemplates a device that can be used for both wireless and/or wired voice (e.g. telephony) and wireless and/or wired data communications (e.g. email, web browsing, text, and the like). However, while FIG. 1 contemplates a device that can be used for telephony and messaging, in other implementations, device 101 can comprise a device configured for implementing any suitable specialized functions, including but not limited to one or more of telephony, messaging, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 145, that, when processed by processor 120, enables processor 120 to generate and transmit messages to one or more of server 103 and devices 107, as well as receive messages from one or more of server 103 and devices 107. Application 145 can hence comprise one or more of a messaging application, an email application, a text messaging application, an SMS (short message service) application, an MMS (multimedia message service) application, and the like. It is yet further appreciated that application 145 is an example of programming instructions stored at memory 122.

Processor 120 in turn can also be configured to communicate with a display 126, and optionally a microphone and a speaker. Display 126 comprises any suitable one of or combination of CRT (cathode ray tube) and/or flat panel displays (e.g. LCD (liquid crystal display), plasma displays, OLED (organic light emitting diode) displays, LED (light emitting diode) displays, capacitive or resistive touch screens, and the like). When display 126 comprises a touch screen, it is appreciated that display 126 and input device 128 can be combined into one apparatus. A microphone, when present, comprises any suitable microphone for receiving sound and converting the sound to sound data. A speaker, when present, comprises any suitable speaker for providing sound from sound data, audible alerts, audible communications received from remote communication devices, and the like, at device 101. In some implementations, input device 128 and display 126 are external to device 101, with processor 120 in communication with each of input device 128 and display 126 using a suitable connection and/or link.

Processor 120 also connects to interface 124, which can be implemented as one or more radios and/or connectors and/or network adaptors, configured to communicate with server 103 using link 140. In general, it will be appreciated that interface 124 is configured to correspond with the network architecture that is used to implement link 140, as described above. In other implementations a plurality of links with different protocols can be employed and thus interface 124 can comprise a plurality of interfaces to support each link. In any event, it is appreciated that any suitable combination of interfaces is within the scope of present implementations.

It is yet further appreciated that device 101 comprises a power source (not depicted), for example a battery or the like. In some implementations the power source can comprise a connection to a mains power supply and a power adaptor (e.g. and AC-to-DC (alternating current to direct current) adaptor).

Further, it should be understood that in general a wide variety of configurations for device 101 are contemplated.

While schematic diagrams of devices 107 are not depicted, each of devices 107 can be similar to device 101. Hence, each of devices 107 can comprise respective processors, memories, communication interfaces, displays and optional microphones and speakers.

It is appreciated that FIG. 1 further depicts a schematic diagram of server 103 according to non-limiting implementations. It should be emphasized that the structure of server 103 in FIG. 1 is purely an example, and contemplates a server that can be used for handling messages for device 101. However, while FIG. 1 contemplates a mail server, a messaging server, a proxy server and the like, in other implementations, server 103 can comprise a server configured for implementing any suitable specialized functions, including but not limited to one or more of telephony, messaging, computing, appliance, and/or entertainment related functions.

Processor 130 can be implemented as a plurality of processors, including but not limited to one or more central processors (CPUs). Processor 130 is configured to communicate with a memory 132 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of server 103 as described herein are typically maintained, persistently, in memory 132 and used by processor 130 which makes appropriate utilization of volatile storage during the execution of such programming instructions. Those skilled in the art recognize that memory 132 is an example of computer readable media that can store programming instructions executable on processor 130. Furthermore, memory 132 is also an example of a memory unit and/or memory module.

In particular, it is appreciated that memory 132 stores application 150, that, when processed by processor 130, enables processor 130 to: in response to receiving, using interface 134, a message comprising a given identifier, automatically generate a distribution list comprising at least one network address associated with the message. It is yet further appreciated that application 145 is an example of programming instructions stored at memory 132. Further, in some implementations, application 150 can comprise a server plugin module.

Processor 130 also connects to interface 134, which can be implemented as one or more radios and/or connectors and/or network adaptors, configured to communicate with server 103 using links 140, 141. In general, it will be appreciated that interface 134 is configured to correspond with the network architecture that is used to implement links 140, 141, as described above. In other implementations a plurality of links with different protocols can be employed and thus interface 134 can comprise a plurality of interfaces to support each link. In any event, it is appreciated that any suitable combination of interfaces is within the scope of present implementations.

Processor 130 in turn can also be configured to communicate with an optional input device and display (not depicted), which can be internal or external to server 103. Data for configuring server 103 can be received locally using the input device and rendered at the display. Alternatively, data for configuring server 103 can be received using interface 134, for example, in a client-server environment and the like.

It is yet further appreciated that server 103 comprises a power source (not depicted), for example a battery or the like. In some implementations the power source can comprise a connection to a mains power supply and a power adaptor (e.g. and AC-to-DC (alternating current to direct current) adaptor).

Further, it should be understood that in general a wide variety of configurations for server 103 are contemplated.

Figure 2:
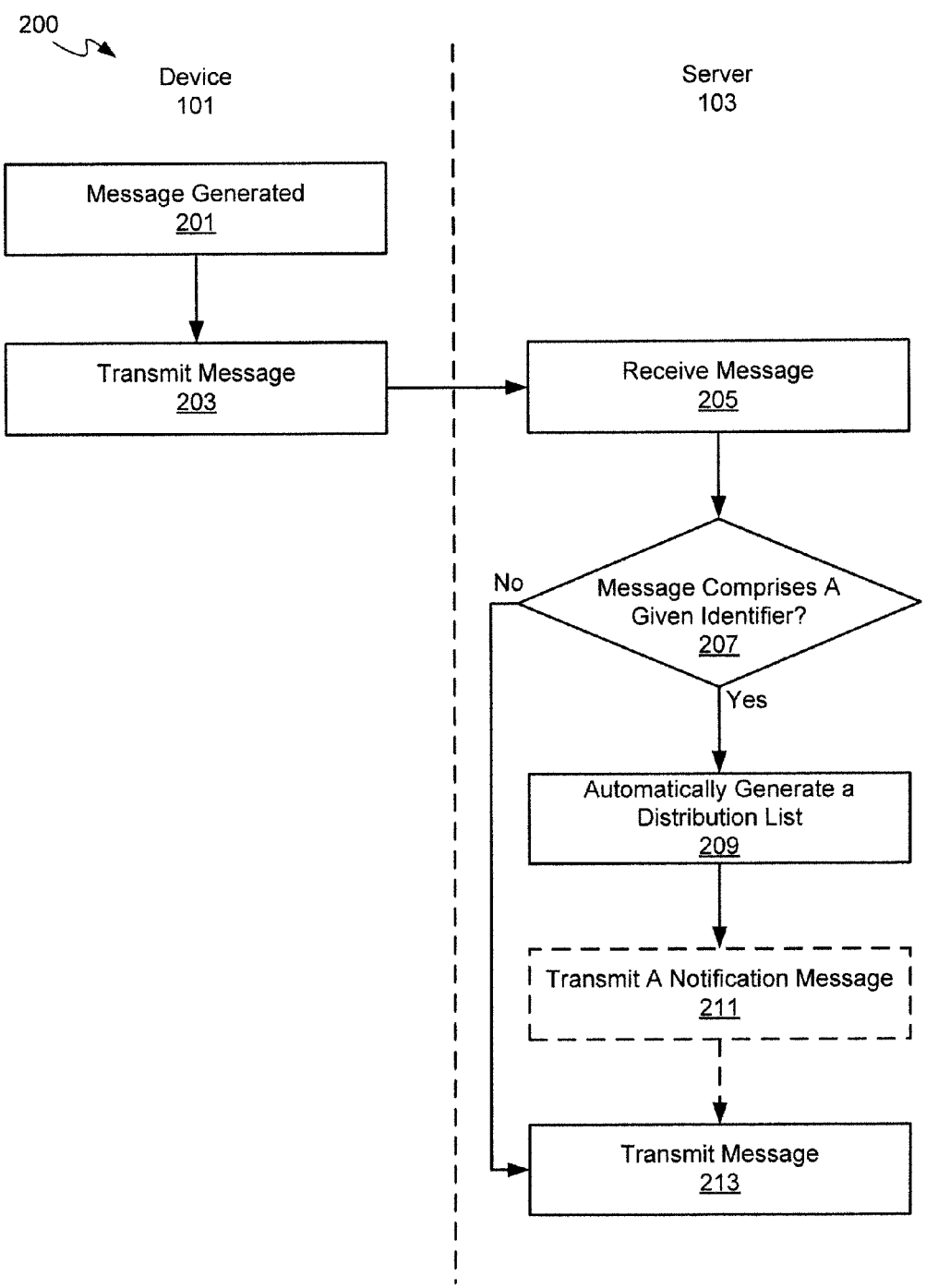
FIG. 2 depicts a flowchart of a method for automatically generating distribution lists, according to non-limiting implementations.

Attention is now directed to FIG. 2 which depicts a flowchart of a method 200 for dynamically generating a distribution list, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations.

It is appreciated that, in some implementations, method 200 is implemented in system 100 by processors 120, 130, respectively, of device 101 and server 103. Indeed, method 200 is one way in which system 100, device 101 and server 103 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 120 of device 101 generates a message, for example using input data received using input device 128 while processing application 145. At block 203, processor 120 transmits the message to server 103 using interface 124 and link 140. In general, while messages from device 101 can be addressed to any of devices 107, and the like, the message is transmitted to server 103 for handling, and server 103 transmits the message to devices 107 to which the message is addressed. Indeed, application 145 is configured to cause messages to be transmitted to server 103 regardless of the intended destination of the messages. It is further appreciated that, in some implementations, a device 107 can request messages from server 103: for example, in implementations where the messages comprise email messages, server 103 can store messages in association with accounts that are in turn associated with devices 107; some email servers can push messages to devices, while other email servers wait for devices to request messages.

At block 205, the message transmitted at block 203 is received at processor 130 of server 103 using interface 134. Processor 130 processes the message and, at block 207, processor 130 determines whether the message comprises given identifier 144. In response to receiving, using interface 134, a message comprising given identifier 144 (i.e. a "Yes" decision at block 207), at block 209 processor 130 automatically generates a distribution list comprising at least one network address associated with the message. It is appreciated that processor 130 can further name the distribution list and save the distribution list, for example at memory 132. It is further appreciated that the at least one network address associated with the message can comprise one or more of: a network address of device 101; and, a network address of at least one device 107.

At an optional block 211, processor 130 can transmit, using the communication interface, a notification message notifying that the distribution list was generated to one or more of: the at least one network address (e.g. network addresses of one or more device 101 and devices 107); and, device 101 (e.g. a device from which the message was received). The notification message can further comprise a link for one or more of: unsubscribing from the distribution list; and, editing the distribution list.

Also optionally, at block 213, processor 130 can transmit the message to devices 107 to which the message was addressed; alternatively, processor 130 does not transmit the message to devices 107 to which the message was addressed as the message is determined to be a distribution list generation message that is not to be transmitted to devices 107.

Returning to block 207, when processor 130 determines that the message does not comprise given identifier 144 (i.e. a "No" decision at block 207), at block 213, processor 130 transmits the message to the devices 107 to which the message is addressed. In other words, the message is determined not to be a distribution list generation message.

Figure 3:
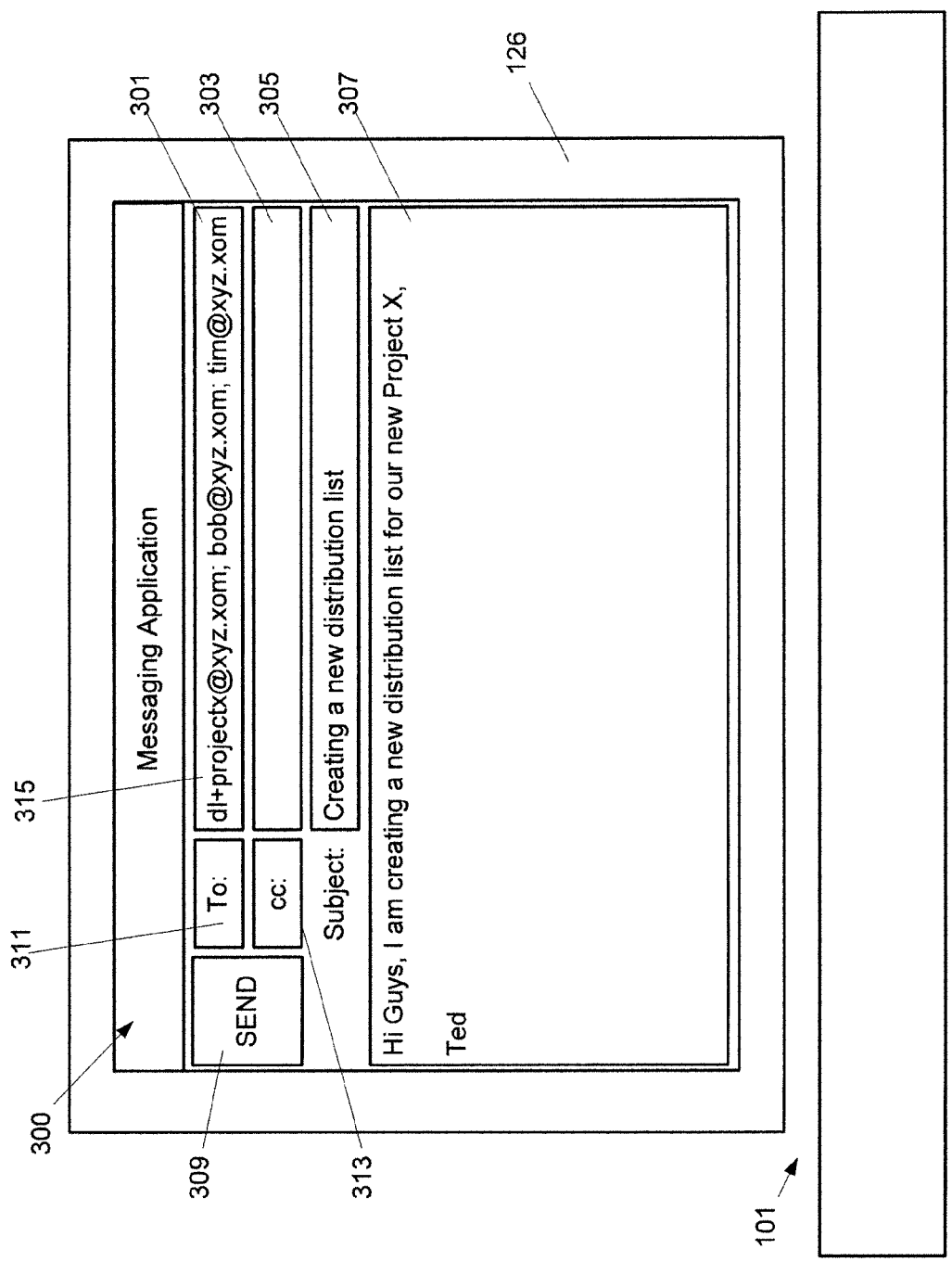
FIG. 3 depicts a Graphic User Interface (GUI) for composing a message at a device of the system of FIG. 1, the message for automatically generating distribution lists, according to non-limiting implementations.
Figure 4:
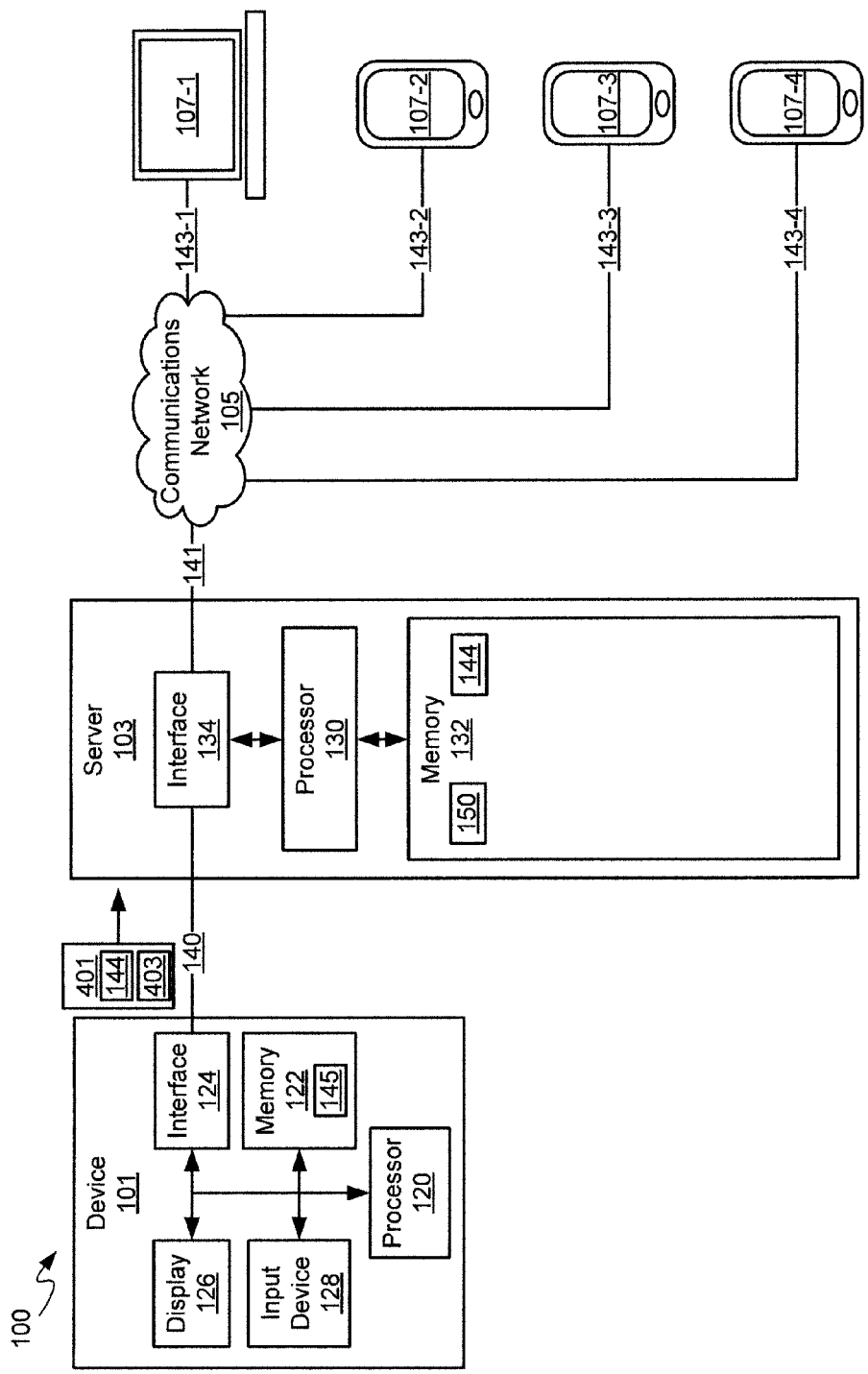
FIG. 4 depicts a server of the system FIG. 1 receiving the message generated in the GUI of FIG. 3, according to non-limiting implementations.
Figure 5:
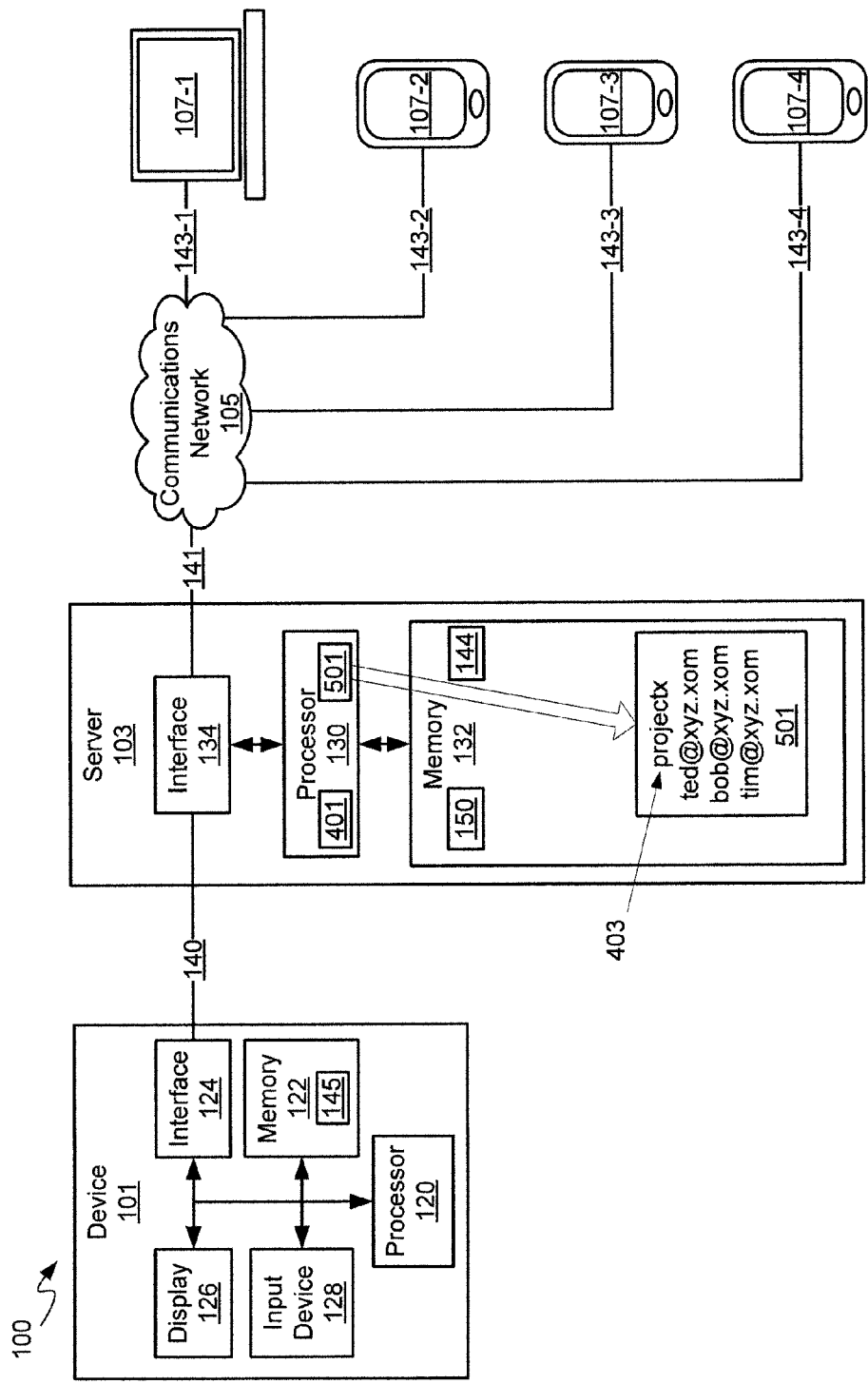
FIG. 5 depicts the server of the system FIG. 1 automatically generating a distribution list, according to non-limiting implementations.
Figure 6:
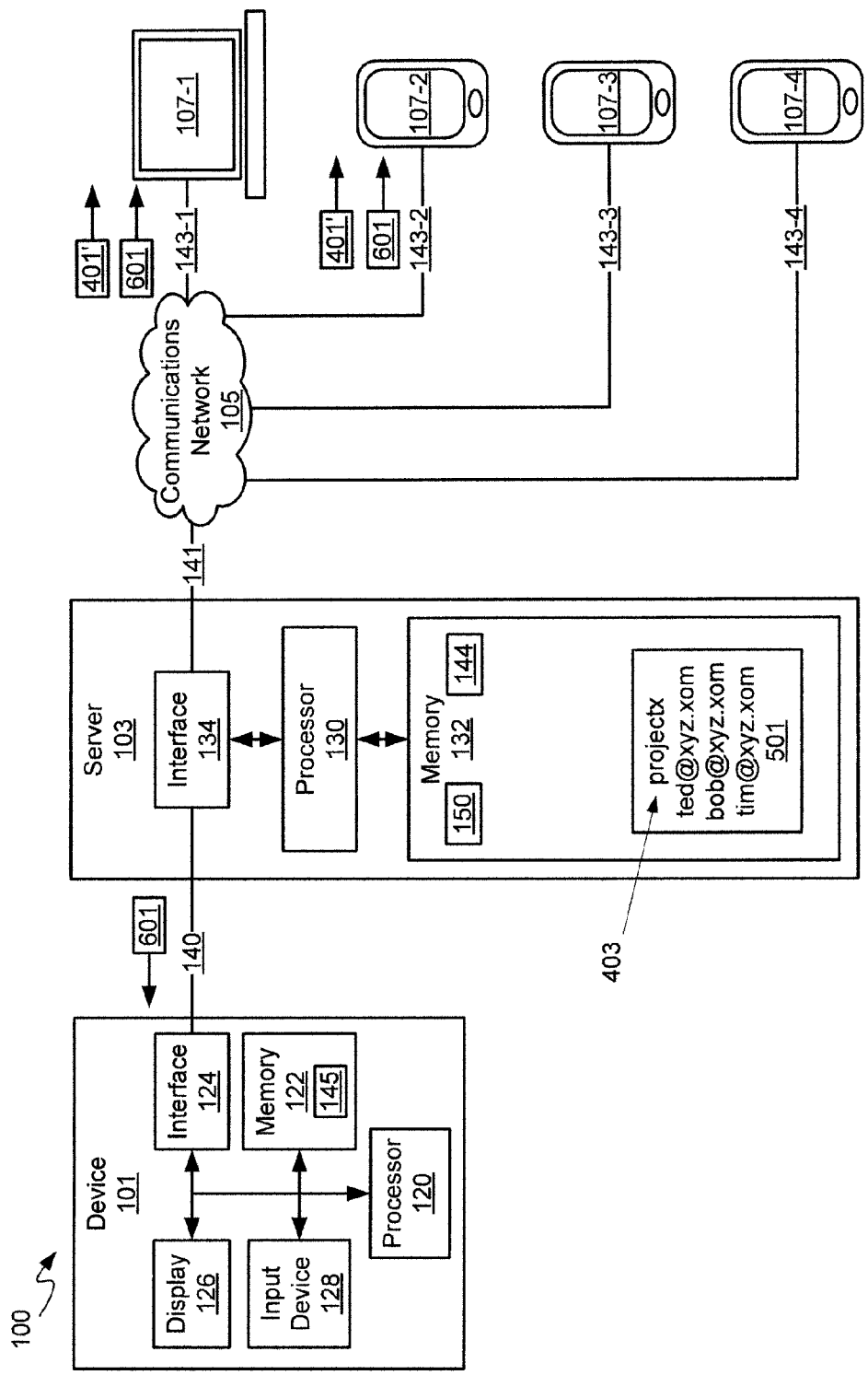
FIG. 6 depicts the server of the system FIG. 1 automatically transmitting notification messages in response to generating a distribution list, according to non-limiting implementations.
Figure 7:
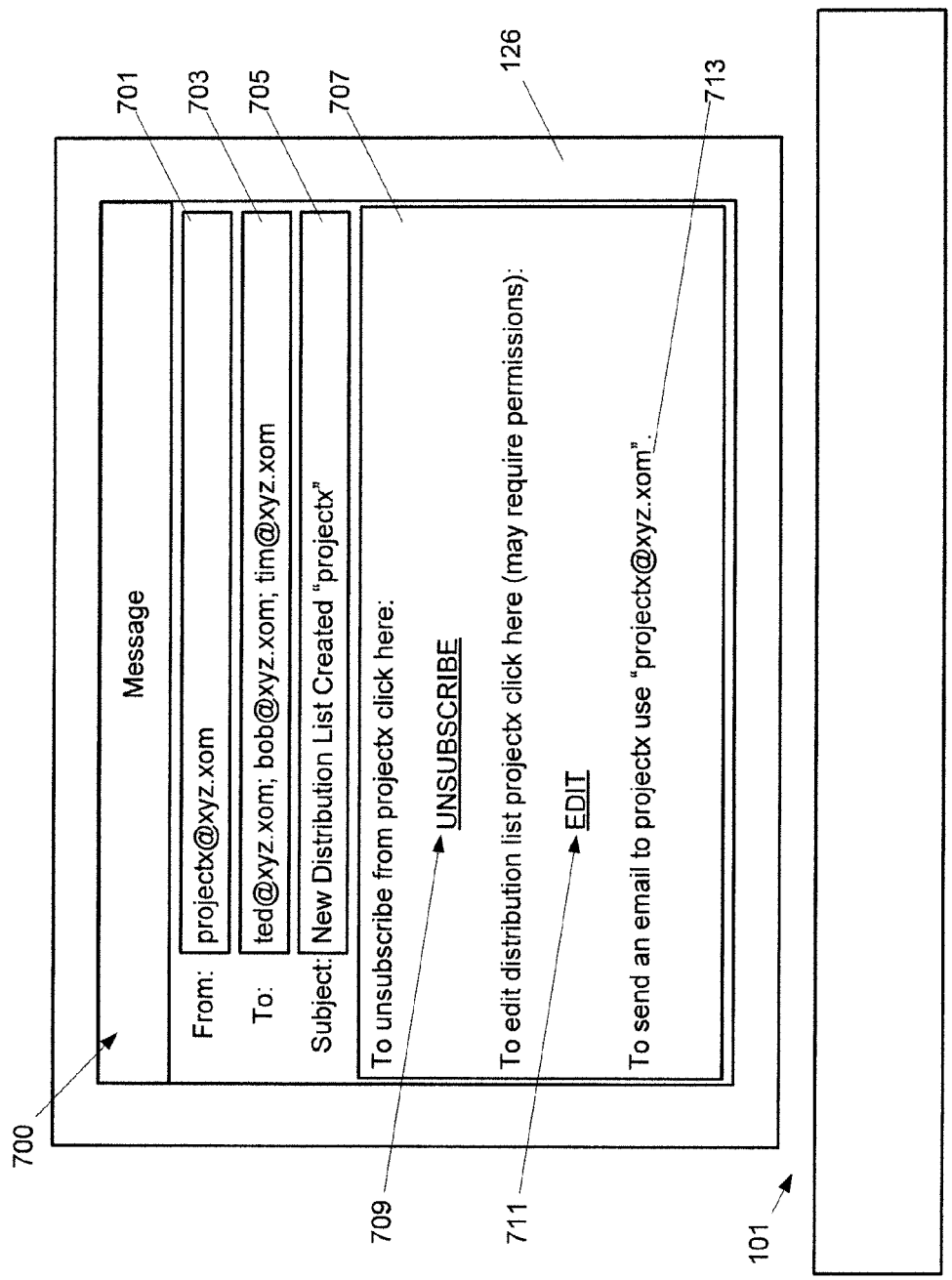
FIG. 7 depicts a GUI of a notification message transmitted in FIG. 6, according to non-limiting implementations.

A non-limiting example of method 200 will now be described with reference to FIGS. 3 to 7. FIGS. 3 and 7 each depict non-limiting examples of graphic user interface (GUI) of messaging application 145 at display 126 of device 101. Each of FIGS. 4 to 6, are similar to FIG. 1, with like elements having like numbers.

Beginning with FIG. 3, a message is generated (e.g. block 201) in a GUI 300 of messaging application 145, comprising fields 301, 303, 305, 307 and a virtual button 309. Network addresses are received at field 301 (e.g. a "To:" field). Network addresses can optionally be received at field 303 (e.g. a "cc:" field). A "Subject" of the message can be received at field 305. A body of the message can be received at field 307. Network addresses for each of fields 301, 303, and text data (and the like) for fields 305, 307 can be received using input data at input device 128. Alternatively, network addresses for fields 301, 303 can be selected from lists of network addresses stored at device 101 accessible using respective virtual buttons 311, 313.

The message can be transmitted upon receipt of input data at input device 128 indicating that virtual button 309 has been actuated (e.g. a "Send" button).

It is further appreciated that each of the depicted network addresses comprises an email address and hence, in these implementations, messaging application 145 comprises an email messaging application. However, network addresses can include any type of network address that can be used to send a message in a corresponding messaging application, including, but not limited to, a message addressing, a device identifier, a MAC (media access control) address, an IP (internet protocol) address and the like.

In any event, in a non-limiting example, field 301 comprises network addresses including, but not limited to, at least one network address associated with devices 107 (e.g. "bob@xyz.xom" and "tim@xyz.xom") and an other network address 315 (e.g. "dl+projectx@xyz.xom"), indicating that the message being generated comprises a distribution list generation message.

It is appreciated that each of the network addresses comprises an email address having the following format: local-part@domain-part. It is further appreciated that the local part of other network address 315 has a format "given-identifier, distribution-list-name"; in the non-limiting example, given identifier 144 comprises text "dl+" and the distribution list name comprises text "projectx". It is appreciated that given identifier 144 identifies other network address 315 as a special network address intended to trigger generation of a distribution list at server 103 comprising one or more of the network address of device 101 and the remaining network addresses in field 301; the distribution list will have the distribution list name, as described below.

In depicted implementations, each of the network addresses, bob@xyz.xom, tim@xyz.xom comprises a network address associated with a device 107, for example devices 107-1, 107-2; for example, see FIG. 4.

In other words, a user of device 101 wishes to have a distribution list generated at server 103, with a name "projectx", the distribution list comprising network addresses bob@xyz.xom, tim@xyz.xom, as well as a network address associated with device 101 which, in a non-limiting example, can comprise ted@xyz.xom; for example, see FIG. 4.

In other words, in these implementations, the message being generated is addressed to at least other network address 315 (e.g. "dl+project@xyz.xom") different from the at least one network address (e.g. "bob@xyz.xom", "tim@xyz.xom"), the other network address 315 comprising given identifier 144 (e.g. "dl+"). Further, a local part of the other network address 315 comprises given identifier 144. Further, as depicted, a local part of the other network address can comprise given identifier 144 and a name of the distribution list.

However, in some implementations, network addresses associated with device 107 can be absent and only other network address 315 can be included in field 301 and/or field 303. Hence, the distribution list to be generated will comprise a network address associated with device 101 (e.g. "ted@xyz.xom").

It is further appreciated that, in the non-limiting example, each of the network addresses have the same domain part, "xyz.xom".

It is yet further appreciated that text, and the like, received at field 307 comprises a body of a message.

It is yet further appreciated that while in the non-limiting example of FIG. 3, given identifier 144 comprises text "dl+", any given identifier is within the scope of present implementations including, but not limited to textual given identifiers and graphic given identifiers. It is yet further appreciated that while in the non-limiting example of FIG. 3, given identifier 144 is part of a network address in "To:" field 301 of a message (and/or in "cc:" field 303), in other implementations given identifier 144 can comprise text (and/or a graphic) in the "Subject:" field 305 and/or field 307, where given identifier 144 is not part of a network address.

It is further appreciated that, in some implementations, other network address 315 can have a format "given-identifier@domain-name", i.e. no project name is included in network address 315. In these implementations, server 103 can be configured to assign a name to a distribution list which can be one or more of random and based on data associated with device 101, as described in further detail below.

Attention is next directed to FIG. 4, which depicts a message 401 being transmitted to server 103 (block 203) and received at server 103 (block 205), message 401 comprising the data received at GUI 300, including but not limited to given identifier 144 and a name 403 of a distribution list, message 401 addressed to the network addresses at field 301 of GUI 300. In non-limiting examples described herein, given identifier 144 can comprise "dl+" and name 403 can comprise "projectx". It is appreciated that FIG. 4 further depicts a network address associated with each device 101, 107.

Attention is next directed to FIG. 5 which depicts message 401 being processed at processor 130 to determine whether message 401 comprises given identifier 144 associated with generating a distribution list, for example "dl+", in the non-limiting example, described above. FIG. 5 further depicts a distribution list 501 being generated in response to message 401 comprising given identifier 144 being received (blocks 207, 209).

From FIG. 5 it is further apparent that processor 130 has named distribution list 501 using name 403 received with given identifier 144, i.e. "projectx", and stored distribution list 501 in memory 132.

In some implementations, as depicted in FIG. 6, server 103 can transmit a notification message 601 notifying that distribution list 501 was generated to network addresses associated with the distribution list, for example one or more of device 101, device 107-1 (associated with network address "bob@xyz.xom" in the non-limiting example) and device 107-2 (associated with network address "tim@xyz.xom" in the non-limiting example). A non-limiting example of a GUI 700 of message 601 rendered at display 126 of device 101 is depicted in FIG. 7, GUI 700 comprising fields 701, 703, 705, and 707. Field 701 comprises a network address of a sender of message 601; in this non-limiting example, message 601 is transmitted by server 103, but server 103 populates field 701 with a network address associated with distribution list 501. Field 703 comprises network addresses of recipients of message 601 (i.e. network addresses associated with distribution list 501). Field 705 comprises a subject of message 601, which is automatically populated by server 103 and can comprise an indication of generation of distribution list 501. Field 707 comprises text indicating how to unsubscribe and/or edit distribution list 501, as well as one or more of a link 709 for unsubscribing from distribution list 501 and a link 711 for editing distribution list 501.

When link 709 is actuated at a respective device 101, 107-1, 107-2, the respective device 101, 107-1, 107-2 transmits a message (not depicted) to server 103 for instructing server 103 to remove a network address associated with the respective device 101, 107-1, 107-2 from distribution list 501.

When link 711 is actuated at a respective device 101, 107-1, 107-2, the respective device 101, 107-1, 107-2 can launch an interface (e.g. a browser and the like) for interacting with server 103 to edit distribution list 501, including, but not limited to: removing network addresses from distribution list 501, adding network addresses to distribution list 501 and deleting distribution list 501 from server 103. The interaction can occur using, for example, a web (e.g. internet) interface accessed from a browser application and/or in a client-server environment. It is further appreciated that, in some implementations, permissions for editing distribution list 501 can be assigned that can be password based (for example a password can be issued in a message to one or more of the network addresses in distribution list 501, and prior to allowing editing of distribution list 501 the password can be requested by server 103).

Alternatively, editing of distribution list 501 can be message based with commands for editing distribution list 501 transmitted in messages to server 103.

In some implementations, actuation of one or more of links 709, 711 can further trigger an authentication action prior to the associated unsubscribing and/or editing.

It is further appreciated that message 601 can be customized by server 103 for each recipient device 101, 107 of message 601. In other words, each message 601 need not be identical. For example, one or more of links 709, 711 can be customized for a given recipient device 101, 107, such that one or more of links 709, 711 can provide links to direct actions without an associated authentication action. In some of these implementations, one or more of links 709, 711 can include a customized hash associated with a given device 101, 107 where a given message 601 is transmitted (and/or associated with a given account associated with the given device 101, 107). When a link 709, 711 in the given message 601 is activated, server 103 will receive the hash and skip an authentication action. In some implementations, the authentication action is skipped only when the hash is received within a given time period after transmitting a given message 601. When the authentication action is skipped, the action associated with the activated link 709, 711 is performed (e.g. unsubscribing, and/or editing).

It is yet further appreciated that message 601 can comprise an address 713 identifying distribution list 501 (e.g. "project@xyz.xom"), such that messages addressed to address 713 received at server 103 are transmitted to network addresses on distribution list 501. In non-limiting implementations, address 713 can comprise a format: "distribution-list-name@domain-name", where the distribution list name comprises the distribution list name 403 received with message 401 (i.e. in the network address comprising given identifier 144 and the distribution list name described above with reference to FIG. 4); the domain name comprises the same domain name received with message 401 in the network address comprising given identifier 144 and distribution list name 403.

Address 713 can also be used to unsubscribe from distribution list 501 by one or more of devices 101, 107-1, 107-2 transmitting a message to server 103 using address 713 with the word "Unsubscribe" in a subject field and/or a body of the message.

Alternatively, a plug-in at one or more of devices 101, 107-1, 107-2 can include a virtual button to unsubscribe from distribution list 501 and/or see network addresses associated with distribution list 501.

In some implementations, message 601 is not transmitted, but it is assumed that messages can be distributed to distribution list 501 using an address having the above described format. Indeed, as network address 315, described above with reference to FIG. 4 has a format "given-identifier, distribution-list-name@domain-name", network address 315 comprises address 713 as a subset thereof. Hence it will be apparent to a user of device 101 that is generating message 401 that to distribute messages using distribution list 501, address 713 will have a format "distribution-list-name@domain-name".

With reference to FIG. 6, in yet further implementations server 103 can transmit message 401' to network addresses in field 301 of message 401, except for the network address comprising given identifier 144, message 401' being substantially similar to message 401. In some implementations, message 401' can be identical to message 401, while in other implementations message 401' and message 601 can be combined (e.g. text in fields 307, 707 can be combined into a body of one message). In yet further implementations, message 401' can be similar to message 401 but modified to include an identifier of address 713 to inform recipients of address 713, e.g. in a body of message 401', in a "To:" and/or "cc:" field of message 401' and/or in a "subject" field of message 401', and the like. Further message 401' can be addressed to address 713 with other network addresses removed from a "To:" field.

In any event, once distribution list 501 has been generated, address 713 can be used to transmit messages to network addresses associated with distribution list 501.

It is further appreciated that, in some implementations, other network address 315 can have a format "given-identifier@domain-name", i.e. no project name is included in network address 315. In these implementations, server 103 can be configured to assign a name to distribution list 501 which can be one or more of random and based on data associated with device 101.

For example, assuming that a network address associated with device 101 comprises "ted@xyz.xom", server 103 can assign a name to distribution list based on a local part of network address "ted@xyz.xom", such as "teddl1" and the like. When another distribution list at server 103 has the same name, and a conflict occurs, a number of the assigned name can be incremented until no conflict occurs (e.g. "teddl2").

In some implementations a naming conflict can occur in that another distribution list at server 103 can already have name 403 received from device 101; in these implementations server 103 can add network addresses received with message 401 to the existing distribution list. However, such privileges can be restricted; for example, server 103 can be configured to update the existing distribution list only when the message attempting to add new network addresses to an existing distribution list is received from a device 101, 107 associated with a network address that is already on the existing distribution list and/or from a device 101, 107 associated with a domain part associated with the existing distribution list.

In some implementations, a subsequent notification message can be transmitted to network addresses on distribution list 501 (including the new network addresses), similar to one or more of messages 401', 601 notifying that new network addresses have been added to distribution list 501. In some implementations, all network addresses, except for new network addresses, can be removed from one or more of messages associated with distribution list 501 and the notification message. Alternatively, all new network addresses can be maintained in a first subsequent message to distribution list 501. In yet a further alternative implementation, text can be inserted into a notification message, and the like, indicating the new network addresses.

In any event, restrictions on which devices 101, 107 can update existing distribution lists can be extended to generation of distribution lists. For example, in some cases, distribution list 501 can lead to spamming issues: if a malicious user obtains address 713, the malicious user can transmit unwanted messages to network addresses associated with distribution list 501 using address 713.

In yet further implementations, links similar to links 709, 711 can be included in subsequent messages to distribution list 501; in other words, when server 103 receives a message addressed to address 713, server 103 can modify the message to include links similar to link 709, 711. Indeed, in some implementations, server 103 can be configured to modify every subsequent message to distribution list 501 to include links for one or more of: unsubscribing from distribution list 501; and, editing distribution list 501.

In yet further implementations, server 103 can further process replies to messages originally addressed to distribution list 501 to remove any links similar to links 709, 711. For example, when such links are customized as described above to include a hash associated with a recipient device 101, 107 (such that an authentication action can be skipped), and then forwarded via a reply message and the like, a recipient of the reply message could use the link to perform an action on behalf of the sender of the reply message, which could be unwanted by the sender of the reply.

Hence, in further implementations, system 100 can comprise security features to restrict one or more of: network addresses that can be on distribution list 501 and network addresses that can use distribution list 501. For example, in some implementations all the network addresses on distribution list 501 can be restricted to network addresses having a same domain part, and specifically a domain part associated with an entity associated with server 103. In other words, server 103 can be operated by an entity, such as a business, an organization and the like and distribution lists stored at server 103 can be restricted to network addresses associated with domain part that is in turn associated with the entity (e.g. "xyz.xom"). Hence, in these implementations, when message 401 comprises a network address that has a different domain part from that associated with the entity, that network address can be discarded and/or ignored and/or not placed on distribution list 501. A message notifying of the restriction can be transmitted to device 101 that originated message 401.

Figure 8:
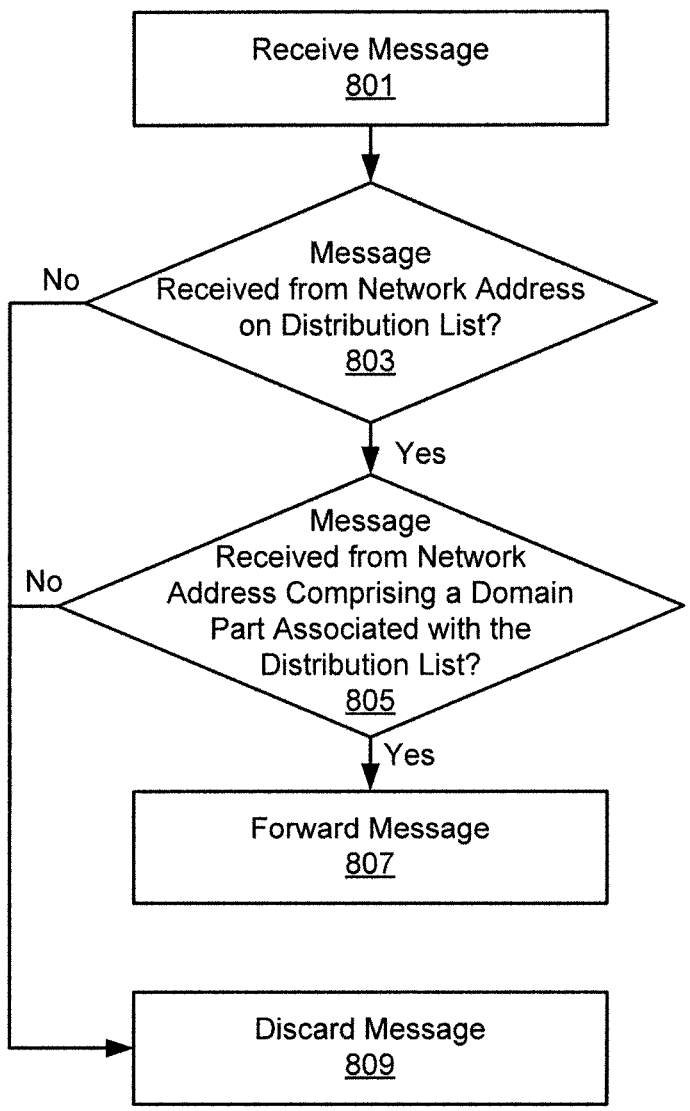
FIG. 8 depicts a flowchart of a method for implementing security features with automatically generated distribution lists, according to non-limiting implementations.

Further, network addresses that can use distribution list 501 can be restricted. For example, attention is directed to FIG. 8 which depicts a flowchart of a method 800 for implementing security features with distribution lists, according to non-limiting implementations. In order to assist in the explanation of method 800, it will be assumed that method 800 is performed using system 100. Furthermore, the following discussion of method 800 will lead to a further understanding of system 100 and its various components. However, it is to be understood that system 100 and/or method 800 can be varied, and need not work exactly as discussed herein in conjunction with each other, and that such variations are within the scope of present implementations.

It is appreciated that, in some implementations, method 800 is implemented in server 103 by processor 130. Indeed, method 800 is one way in which server 103 can be configured. It is to be emphasized, however, that method 800 need not be performed in the exact sequence as shown, unless otherwise indicated; and likewise various blocks may be performed in parallel rather than in sequence; hence the elements of method 800 are referred to herein as "blocks" rather than "steps". It is also to be understood, however, that method 800 can be implemented on variations of system 100 as well.

At block 801, processor 130 receives a message that is addressed to distribution list 501, for example using address 713 (e.g. "project@xyz.xom"). At block 803, processor determines whether the message is received from a network address on distribution list 501. If not (i.e. a "No" decision at block 803), at block 809, processor 130 discards the message and/or blocks the message from being distributed to network addresses on distribution list 501.

If so (i.e. a "Yes" decision at block 803), at block 805 processor 130 determines whether the message is received from a network address comprising a domain part associated with distribution list 501. If not (i.e. a "No" decision at block 805), at block 809, processor 130 discards the message and/or blocks the message from being distributed to network addresses on distribution list 501.

If so (i.e. a "Yes" decision at block 805), at block 807 processor forwards the message to the network addresses on distribution list 501.

It is appreciated that blocks 803, 805 can be performed in any order and/or in parallel with each other. Further, one of blocks 803, 805 can be optional (e.g. processor 130 can discard messages received from network addresses on distribution list or discard messages received from network addresses comprising a domain part not associated with distribution list 501).

In other words, according to method 800, processor 130 is further configured to: receive, using communication interface 134, an other message addressed to distribution list 501; and, forward the other message to the network addresses on distribution list 501 only when the other message is received from one or more of: a network address on distribution list 501; and a network address comprising a domain part associated with distribution list 501.

Figure 9:
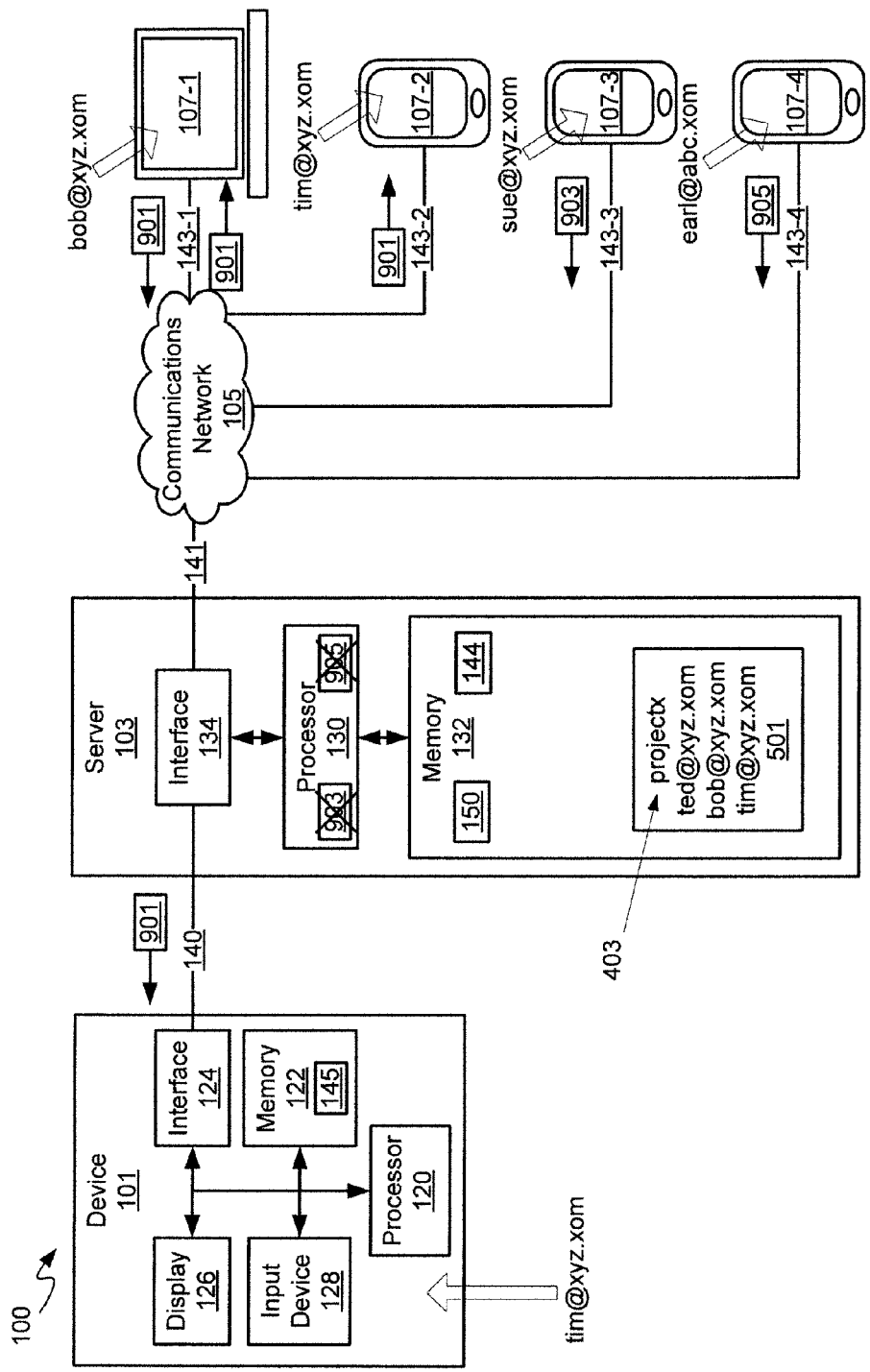
FIG. 9 depicts the system of FIG. 1 implementing the security features of the method of FIG. 8, according to non-limiting implementations.

A non-limiting example of method 800 is now described with reference to FIG. 9, which is substantially similar to FIG. 6, with like elements having like numbers. FIG. 9 depicts network address associated with each device 101, 107. It is appreciated that each of the network addresses associated devices 101, 107-1, 107-2 are on distribution list 501, and that each network addresses associated devices 101, 107-1, 107-2 share a domain part, "xyz.xom".

It is further appreciated that device 107-3 is associated with a network address ("sue@xyz.xom") that is not on distribution list 501 but having a same domain part as network addresses associated with distribution list 501. Hence, each of devices 101, 107-1, 107-2, 107-3 can be associated with an entity that is in turn associated with domain part "xyz.xom", including, but not limited to, a business and the like, even though the network address associated with device 107-3 is not on distribution list 501.

In contrast to devices 101, 107-1, 107-2, 107-3, device 107-4 is associated with a network address comprising a domain part different from network addresses associated with devices 101, 107-1, 107-2, 107-3, and hence device 107-4 is associated with a different entity. Neither is the network address associated with device 107-4 on distribution list 501.

In any event, in FIG. 9, each of devices 107-1, 107-3 107-4 transmits a respective message 901, 903, 905 to server 103, each of messages 901, 903, 905 addressed to distribution list 501 (i.e. using address 713). Messages 901, 903, 905 are each received at server 103 (block 801), implementing method 800.

At block 803, message 901 will be determined to be associated with a network address (i.e. "bob@xyz.xom") on distribution list 501 and at block 805, message 901 will be determined to be associated with a domain part ("xyz.xom") associated with distribution list 501; hence at block 807, message 901 will be distributed to network addresses on distribution list 501, as depicted.

At block 803, message 903 will be determined to be not associated with a network address (i.e. "sue@xyz.xom") on distribution list 501, hence at block 809, message 903 will be discarded, as depicted.

However, when block 805 is implemented prior to block 803, at block 805, message 903 will be determined to be associated with a domain part ("xyz.xom") associated with distribution list 501; if block 803 is implemented, message 903 will be discarded (as depicted). But when block 803 is not implemented, then message 903 will be distributed to network addresses on distribution list 501 similar to message 901. In other words, in these implementations, when block 803 is not implemented, devices 107 associated with the domain part associated with distribution list 501 can use distribution list 501.

At block 803, message 905 will be determined to be not associated with a network address (i.e. "earl@abc.xom") on distribution list 501, hence at block 809, message 905 will be discarded, as depicted.

When block 805 is implemented prior to block 803, at block 805, message 905 will be determined to be not associated with a domain part ("xyz.xom") associated with distribution list 501 (i.e. message 905 is associated with a domain part "abc.xom" different from "xyz.xom"), and message 905 will be discarded (as depicted).

Hence, regardless of which of blocks 803, 805 are implemented and regardless of an order in which they are implemented, message 905 is discarded, thereby preventing spammers from spamming network addresses on distribution list 501.

Figure 10:
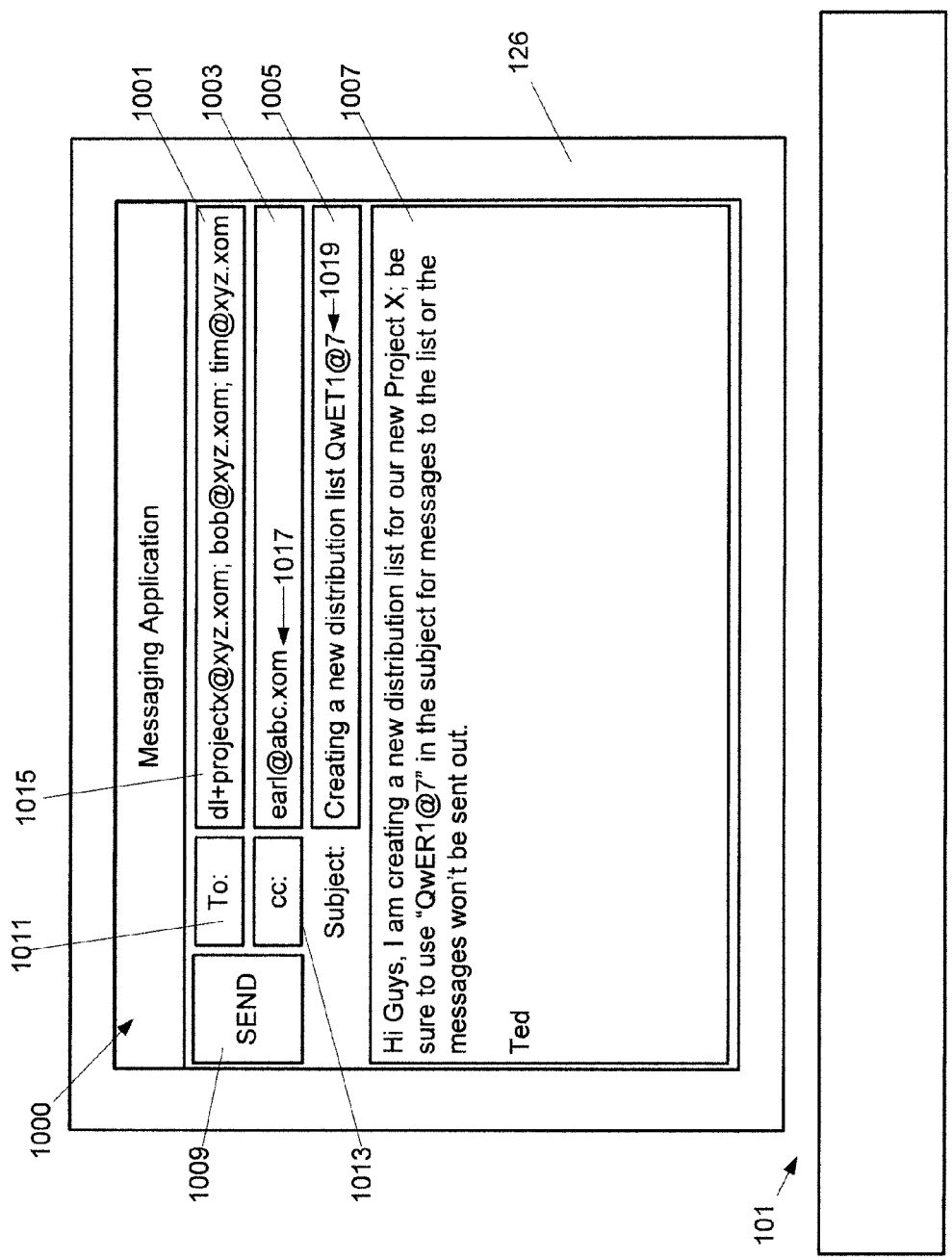
FIG. 10 depicts a GUI for composing a message at a device of the system of FIG. 1, the message for automatically generating distribution lists with associated security keywords to provide security, according to non-limiting implementations.

Heretofore, only implementations where network addresses on distribution list 501 share a common domain part have been considered, in order to prevent spamming. However, in other implementations, distribution lists can be generated with network addresses having different domain parts; such implementations can include security features to prevent spamming. For example, attention is directed to FIG. 10 which depicts a graphic user interface (GUI) of messaging application 145 at display 126 of device 101 in further implementations. FIG. 10 is substantially similar to FIG. 3, with like elements having like numbers but preceded by a "10" rather than "3". For example, FIG. 10 depicts another GUI 1000 of messaging application 145, comprising fields 1001, 1003, 1005, 1007 and a virtual button 1009. Network addresses are received at field 1001 (e.g. a "To:" field). Network addresses can optionally be received at field 1003 (e.g. a "cc:" field). A "Subject" of the message is received at field 1005. A body of the message is received at field 1007. Network addresses for each of fields 1001, 1003, and text data for field 1005 can be received using input data at input device 128. Alternatively, network addresses for fields 1001, 1003 can be selected from lists of network addresses stored at device 101 accessible using respective virtual buttons 1011, 1013.

As depicted, in FIG. 10, field 1001 comprises the same network addresses as field 301 of FIG. 3, including other network address 1015 similar to network address 315. Further, field 1003 comprises a network address 1017 with a different domain part from network addresses in field 1001, though network address 1017 could alternatively be in field 1001.

Further "Subject:" field 1005 comprises a keyword 1019 (e.g. "QwET1@7"), which can be chosen by a user of device 101 and received at processor 120 using input device 128. Keyword 1019 can be likened to a password for a distribution list to be generated by server 103 (e.g. upon receipt of a message transmitted with virtual button 1009 is actuated, as will be described below). Further, keyword 1019 can be located in a particular location in GUI 1000, including, but not limited to, a last word in field 1005 (as depicted), a first word in field 1005, a location in field 1007. Further, keyword 1019 can be delimited using given characters and/or given text in association with keyword 1019; for example, in some implementations, one or more of fields 1005, 1007 can comprise text "Password=QwET1@7", indicating that "QwET1@7" is a keyword to be associated with a distribution list to be generated at server 103.

Further, in particular depicted non-limiting example implementations, text in field 1007 indicates that keyword 1019 is to be included in a subject field of subsequent messages to be distributed to the distribution list. However a location of keyword 1019 in subsequent messages can be in one or more of a subject field and a body of a message.

Once virtual button 1009 is actuated, server 103 generates a distribution list 1101 upon receipt of message 1111 from device 101. Message 1111 is similar to message 401 and comprises given identifier 144 and name 403, however message 1111 further comprises keyword 1019. Distribution list 1101 is similar to distribution list 501, however distribution list 1101 further comprises network address 1017 and keyword 1019. Alternatively keyword 1019 can be saved in association with distribution list 1101.

In yet further alternatives, message 1111 is similar to message 401 and does not comprise a keyword, however server 103 can be configured to generate a keyword and transmit a message to network addresses on distribution list 1101 to provide a notification of the keyword.

Figure 11:
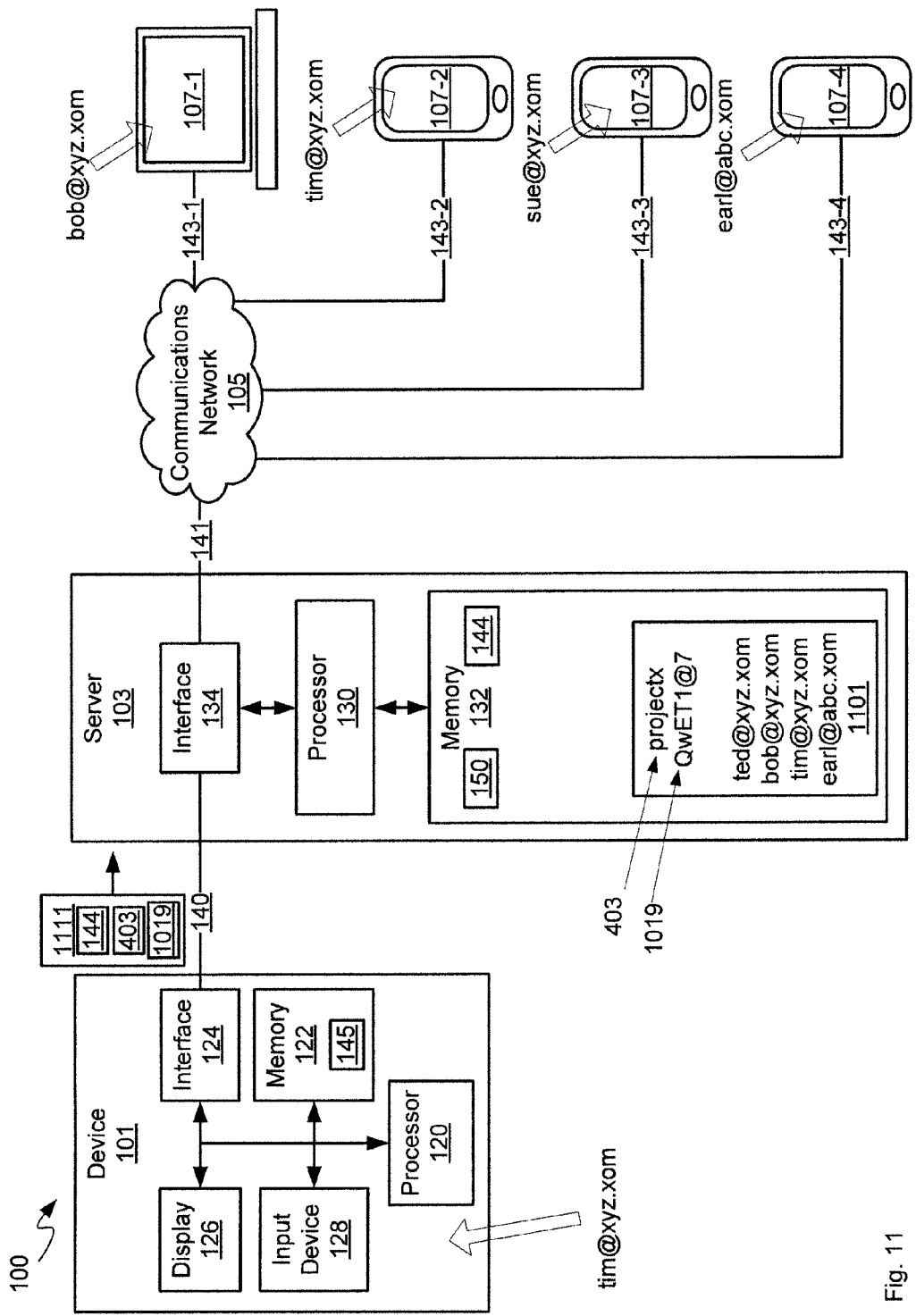
FIG. 11 depicts a server of the system FIG. 1 receiving the message generated in the GUI of FIG. 10, according to non-limiting implementations.

Either way, a keyword can hence be used to control distribution of messages addressed to distribution list 1101, for example using address 713, as a name of distribution list 1101 is the same as distribution list 501; indeed, it is appreciated that, in FIG. 11, it is assumed that distribution list 501 has not been previously generated and hence there are no conflicts between a names distribution list 501, 1101.

Figure 12:
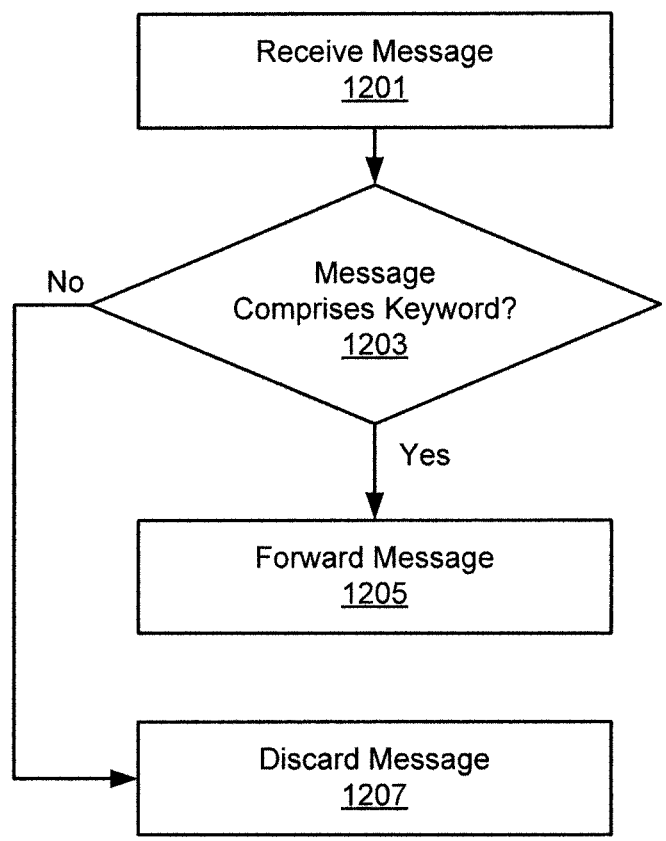
FIG. 12 depicts a flowchart of a method for implementing security features with automatically generated distribution lists, according to non-limiting implementations.

Attention is hence next directed to FIG. 12 which depicts a flowchart of a method 1200 for implementing security features with distribution lists, according to non-limiting implementations. In order to assist in the explanation of method 1200, it will be assumed that method 1200 is performed using system 100. Furthermore, the following discussion of method 1200 will lead to a further understanding of system 100 and its various components. However, it is to be understood that system 100 and/or method 1200 can be varied, and need not work exactly as discussed herein in conjunction with each other, and that such variations are within the scope of present implementations.

It is appreciated that, in some implementations, method 1200 is implemented in server 103 by processor 130. Indeed, method 1200 is one way in which server 103 can be configured. It is to be emphasized, however, that method 1200 need not be performed in the exact sequence as shown, unless otherwise indicated; and likewise various blocks may be performed in parallel rather than in sequence; hence the elements of method 1200 are referred to herein as "blocks" rather than "steps". It is also to be understood, however, that method 1200 can be implemented on variations of system 100 as well.

At block 1201, processor 130 receives a message that is addressed to distribution list 1101, for example using address 713 (e.g. "project xyz.xom"). At block 1203, processor 130 determines whether the message comprises a given keyword, for example keyword 1019. When the message comprises the given keyword (i.e. a "Yes" decision at block 1203), the message is forwarded to the network addresses on distribution list 1101 at block 1205; however, when the message does not comprise the given keyword (i.e. a "No" decision at block 1203), the message is discarded at block 1207.

In other words, in these implementations, processor 130 is further configured to: receive, using communication interface 124, an other message addressed to distribution list 1101; and, forward the other message to the network addresses on distribution list 110 only when the other message comprises a given keyword.

Figure 13:
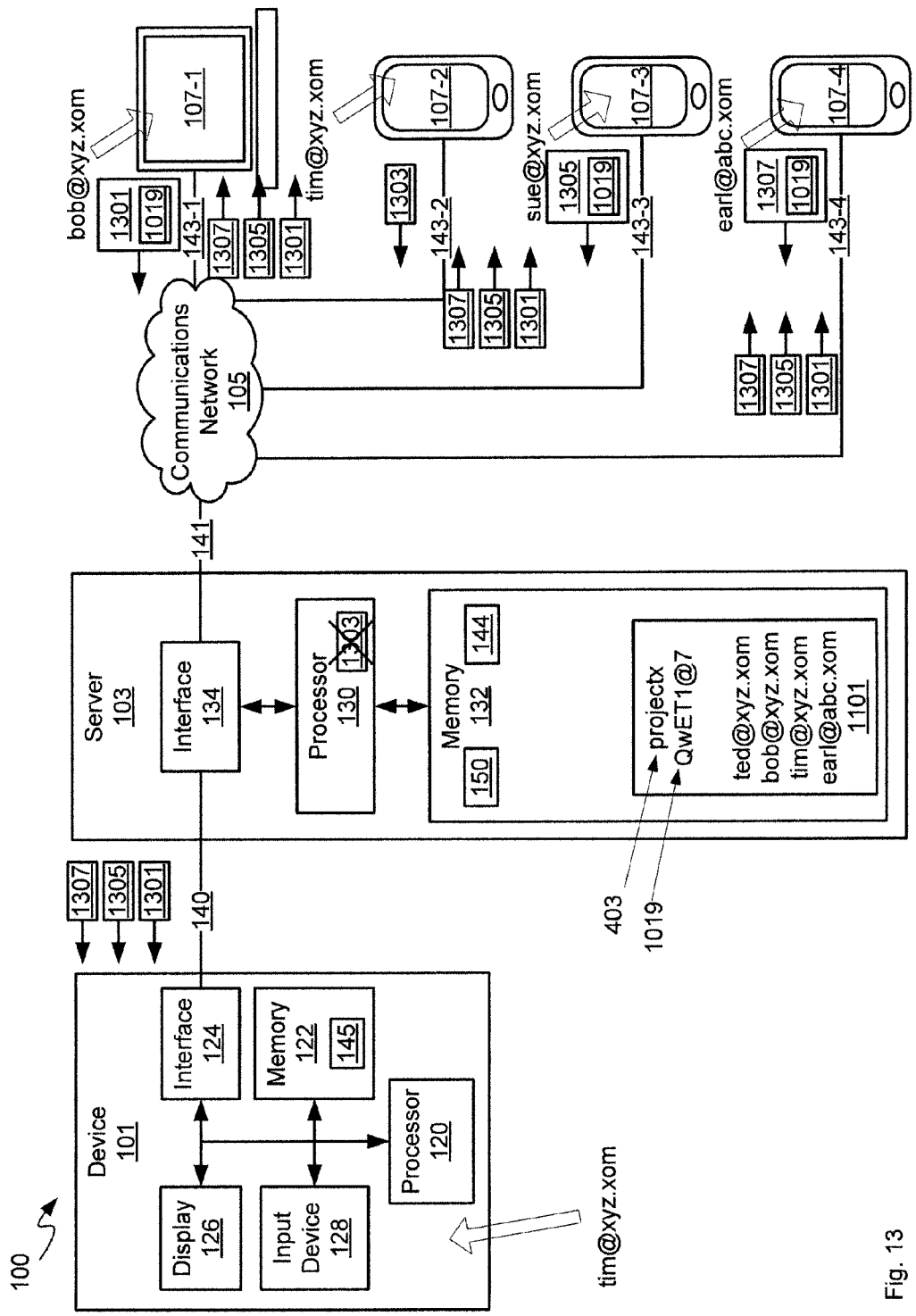
FIG. 13 depicts the system of FIG. 1 implementing the security features of the method of FIG. 12, according to non-limiting implementations.

A non-limiting example of method 1200 is now described with reference to FIG. 13, which is substantially similar to FIG. 11, with like elements having like numbers. In FIG. 13, each of devices 107-1, 107-2, 107-3, 107-4 transmits a respective messages 1301, 1303, 1305, 1307 to server 103, each of messages 1301, 1303, 1305, 1307 addressed to distribution list 1101 (i.e. using address 713). Message 1303 does not comprise keyword 1019. However, each of messages 1301, 1305, 1307 comprise keyword 1019, for example in a respective subject field and/or in a respective body of each message 1301, 1305, 1307.

Figure 14:
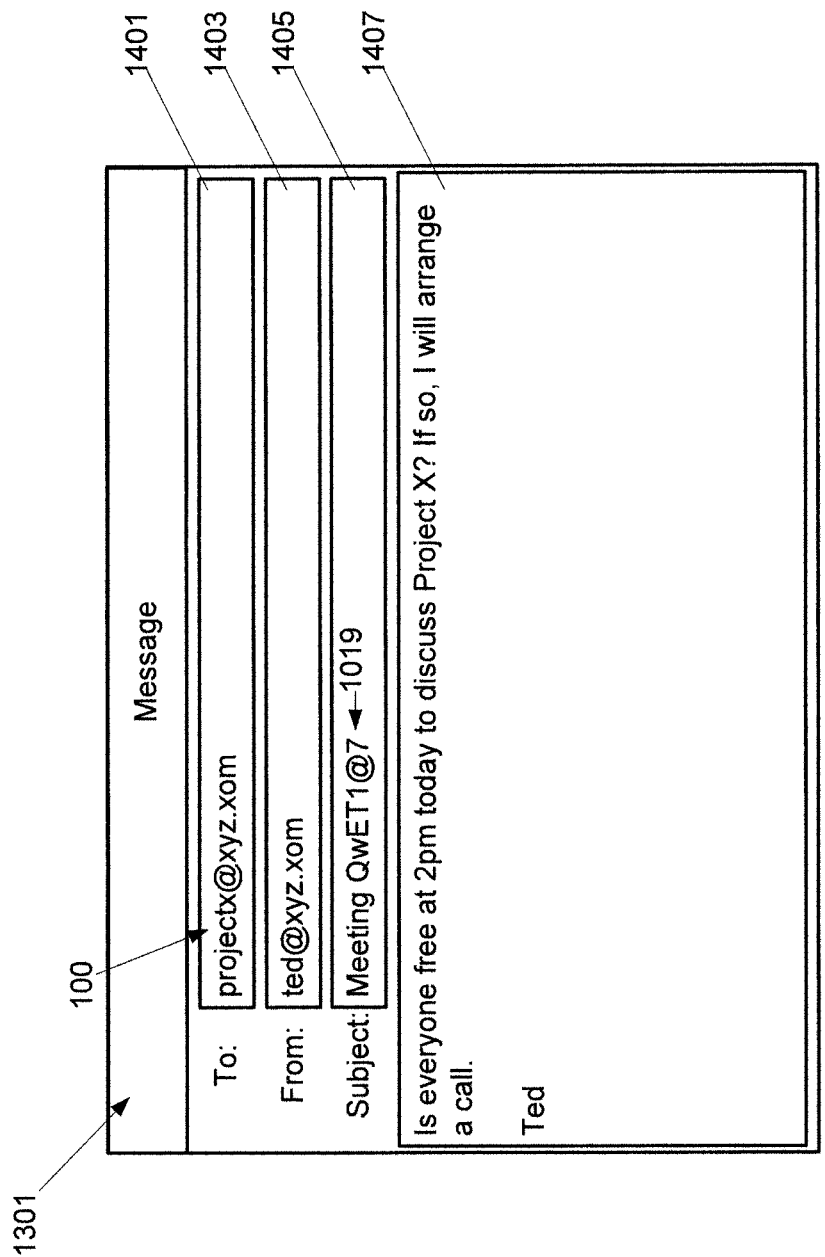
FIG. 14 depicts a GUI of a message addressed to a distribution list having a security keyword, according to non-limiting implementations.

Indeed, a non-limiting example of message 1301 is depicted in FIG. 14, message 1301 comprising fields 1401, 1403, 1405, 1407. Field 1401 comprises a "To:" field comprising address 713 (i.e. an address associated with distribution list 1101). Field 1403 comprises a "From:" field, comprising an address associated with device 107-1 (i.e. "ted@xyz.xom"). Field 1405 comprises a "Subject:" field, comprising text ("Meeting") indicating a subject of message 1301, as well as keyword 1019. Field 1407 comprises text of a body of message 1301. In alternative implementations, keyword 1019 can be in field 1407. Messages 1305, 1307 can be similarly structured. In some implementations, keyword 1019 can be delimited using suitable text and/or graphics.

Returning to FIG. 13, while message 1303 does not comprise keyword 1019, message 1303 can be otherwise similarly structured to message 1301 depicted in FIG. 14.

Messages 1301, 1303, 1305, 1307 are each received at server 103 (block 1201), implementing method 1200, where each are determined to be addressed to distribution list 1101 using address 713.

At block 1203, message 1301 will be determined to comprise keyword 1019; hence at block 1205, message 1301 will be forwarded to network addresses on distribution list 1101.

At block 1203, message 1303 will be determined to not comprise keyword 1019; hence at block 1207, message 1303 will be discarded, regardless of message 1303 originating from device 107-2 which is associated with a network address that is on distribution list 1101.

At block 1203, message 1303 will be determined to comprise keyword 1019; hence at block 1205, message 1303 will be forwarded to network addresses on distribution list 1101, regardless of message 1305 originating from device 107-5 being associated with a network address that is not on distribution list 1101.

At block 1203, message 1307 will be determined to comprise keyword 1019; hence at block 1205, message 1307 will be forwarded to network addresses on distribution list 1101.

It is further appreciated that address 713 and keyword 1019 can be provided to other devices associated with network addresses that are not on distribution list 1101 and/or associated with network addresses that do not comprise domain parts associated with an entity operating server 103; hence, such devices can send messages to address 713 for distribution to network addresses on distribution list 1101, assuming that such messages also comprise keyword 1019.

Hence, address 713 plays a similar role to a username for logging into one or more of a device and a network, and keyword 1019 plays a similar role to a password for logging into a device or a network with the username. In other words, without both address 713 and keyword 1019, a device is prevented from using distribution list 1101 to distribute messages.

Figure 15:
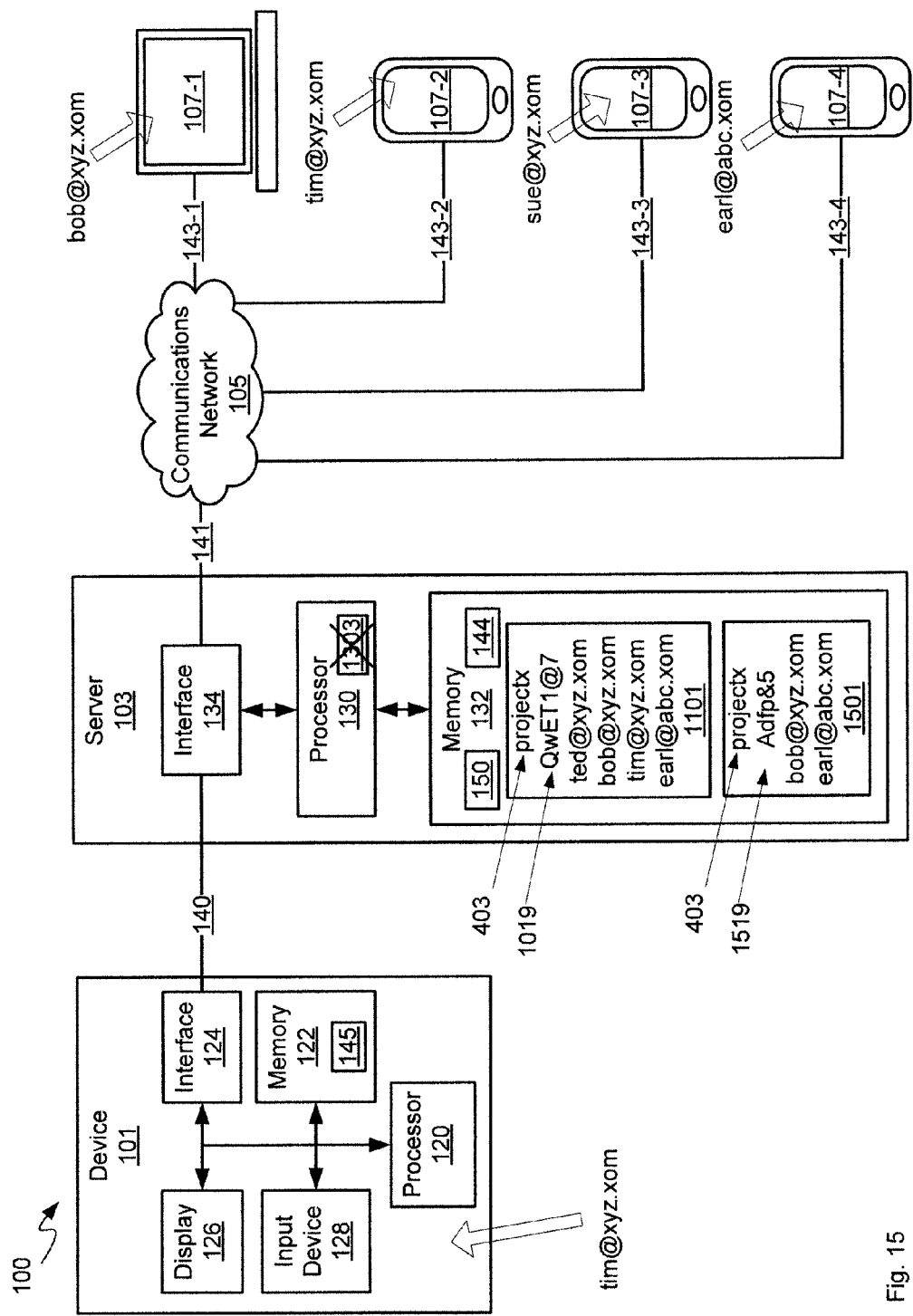
FIG. 15 depicts the server of system of FIG. 1 storing a plurality of distribution lists with the same name but different security keywords, according to non-limiting implementations.

Furthermore, keywords can also be used to generate distribution lists having same names, and same addresses, but different keywords. For example, attention is directed to FIG. 15, which is substantially similar to FIG. 11, with like elements, having like numbers, however in FIG. 11, memory 132 of server 103 stores distribution list 1101 and another distribution list 1501. Each distribution list 1101, 1501 is associated with a same name 403 (i.e. "projectx") and hence each is further associated with a same address 713 (i.e. "projectx@xyz.xom"), however each distribution list 1101, 1501 is associated with a different keyword. For example, distribution list 1101 is associated with keyword 1019 described above (i.e. "QwET1@7") and distribution list 1501 is associated with keyword 1519 (i.e. "Adfp&5"). Each distribution list 1501 can be generated similar to distribution list 1101, but with a distribution list message (similar to message 1111) comprising keyword 1519. While name 1519 of distribution list 1501 received with the distribution list generating message will be the same as name 1019 (i.e. the message is addressed to network address "dl+projectx@xyz.xom", similar to message 1111), keyword 1519 is different from keyword 1019, and hence server 103 generates new distribution list 1501.

Hence when messages addressed to address 713 are received, server 103 can determine which distribution list

1101, 1501 to use by determining which keyword 1019, 1519 is received with the messages.

While present implementations have been described with regards to device 101 initiating generation of distribution lists at server 103, it is appreciated that any of devices 101, 107 can initiate generation of distribution lists at server 103. However, in some implementations, initiating of generating of distribution lists at server 103 can be restricted to devices associated with network addresses having domain parts associated with an entity operating server 103; in other words, only devices 101, 107 associated with the entity can initiate distribution list generation, though devices 107 not associated with the entity can be on a distribution list. However, in yet further implementations, devices 107 not associated with the entity can initiate generation of distribution lists though, in some implementations, permissions for such privileges would be assigned to such devices.

While present implementations have been described with regards to email, it is appreciated that methods 200, 800 and 1200 can be applied to other types of messaging, including, but not limited to, a text messaging, SMS messaging, MMS messaging, and the like.

Present implementations are appreciated to generally enable dynamic and automatic generation of distribution lists in a messaging system, and further enable individual devices to automatically generate system wide distribution lists, which more efficient, and more cost effective, then, for example, messaging an administrator of a messaging system to manually generate distribution lists at a messaging server on behalf of devices in the messaging system. Furthermore, use of keywords as a type of password for distribution lists enable security features to be implemented in the messaging system to prevent spamming using distribution lists.

Those skilled in the art will appreciate that in some implementations, the functionality of device 101, server 103 and devices 107 can be implemented using pre-programmed hardware or firmware elements (e.g., application specific integrated circuits (ASICs), electrically erasable programmable read-only memories (EEPROMs), etc.), or other related components. In other implementations, the functionality of device 101, server 103 and devices 107 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a processor, a memory and a communication interface, the processor configured to:
receive, using the communication interface, a first message addressed to a first network address and one or more second network addresses, the first network address comprising a special network address for triggering generation of a distribution list comprising the one or more second network addresses, a local part of the first network address comprising a given format that includes: a first portion comprising a given identifier identifying the first network address as the special network address, the given identifier being independent of any other network address; and a second portion comprising a name of the distribution list;
in response to receiving the first message: automatically generate the distribution list; name the distribution list using the name received in the second portion; populate the distribution list with the one or more second network addresses, and not the first network address, by extracting the one or more second network addresses as a whole from the first message; and, store the distribution list in the memory;
receive, using the communication interface, a second message addressed to a network address having a local part comprising only the name of the distribution list, the second message comprising text in a body; and,
in response to receiving the second message: forward, using the communication interface, the second message to the one or more second network addresses of the distribution list.

2. The device of claim 1, wherein the processor is further configured to:
transmit, using the communication interface, a notification message notifying that the distribution list was generated to one or more of:
the one or more second network addresses; and,
a sending device from which the first message was received.

3. The device of claim 2, wherein the notification message further comprises a link for one or more of:
unsubscribing from the distribution list; and,
editing the distribution list.

4. The device of claim 1, wherein the processor is further configured to:
forward, using the communication interface, the second message only when the second message is received from one or more of:
one or more of the second network addresses on the distribution list; and,
another network address comprising a domain part associated with the distribution list.

5. The device of claim 1, wherein the processor is further configured to:
forward, using the communication interface, the second message to the one or more second network addresses on the distribution list only when the second message comprises a given keyword.

6. The device of claim 1, wherein the given format of the local part comprises: "given-identifier, distribution-list-name", wherein "given-identifier" is the first portion comprising the given identifier, and "distribution-list-name" is the second portion comprising the name of the distribution list.

7. A method comprising:
at a device comprising a processor, a memory and a communication interface, receiving, using the communication interface, a first message addressed to a first network address and one or more second network addresses, the first network address comprising a special network address for triggering generation of a distribution list comprising the one or more second network addresses, a local part of the first network address comprising a given format that includes: a first portion comprising a given identifier identifying the first network address as the special network address, the given identifier being independent of any other network address; and a second portion comprising a name of the distribution list;
in response to receiving the first message: automatically generating, at the processor, the distribution list; naming, at the processor, the distribution list using the name received in the second portion; populating the distribution list with the one or more second network addresses, and not the first network address, by extracting the one or more second network addresses as a whole from the first message; and, storing, at the processor, the distribution list in the memory;
receiving, using the communication interface, a second message addressed to a network address having a local part comprising only the name of the distribution list, the second message comprising text in a body; and,
in response to receiving the second message: forwarding, using the communication interface, the second message to the one or more second network addresses of the distribution list.

8. The method of claim 7, further comprising:
transmitting, using the communication interface, a notification message notifying that the distribution list was generated to one or more of:
the one or more second network addresses; and,
a sending device from which the first message was received.

9. The method of claim 8, wherein the notification message further comprises a link for one or more of:
unsubscribing from the distribution list; and,
editing the distribution list.

10. The method of claim 7, further comprising:
forwarding, using the communication interface, the second message only when the second message is received from one or more of:
one or more of the second network addresses on the distribution list; and,
another network address comprising a domain part associated with the distribution list.

11. The method of claim 7, further comprising:
forwarding, using the communication interface, the second message to the second network addresses on the distribution list only when the second message comprises a given keyword.

12. The method of claim 7, wherein the given format of the local part comprises: "given-identifier, distribution-list-name", wherein "given-identifier" is the first portion comprising the given identifier, and "distribution-list-name" is the second portion comprising the name of the distribution list.

13. A non-transitory computer program product, comprising a non-transitory computer usable medium having a computer readable program code adapted to be executed to implement a method comprising:
at a device comprising a processor, a memory and a communication interface, receiving, using the communication interface, a first message addressed to a first network address and one or more second network addresses, the first network address comprising a special network address for triggering generation of a distribution list comprising the one or more second network addresses, a local part of the first network address comprising a given format that includes: a first portion comprising a given identifier identifying the first network address as the special network address, the given identifier being independent of any other network address; and a second portion comprising a name of the distribution list;
in response to receiving the first message: automatically generating, at the processor, the distribution list; naming, at the processor, the distribution list using the name received in the second portion; populating the distribution list with the one or more second network addresses, and not the first network address, by extracting the one or more second network addresses as a whole from the first message; and, storing, at the processor, the distribution list in the memory;
receiving, using the communication interface, a second message addressed to a network address having a local part comprising only the name of the distribution list, the second message comprising text in a body; and,
in response to receiving the second message: forwarding, using the communication interface, the second message to the one or more second network addresses of the distribution list.

14. The non-transitory computer program product of claim 13, wherein the given format of the local part comprises: "given-identifier, distribution-list-name", wherein "given-identifier" is the first portion comprising the given identifier, and "distribution-list-name" is the second portion comprising the name of the distribution list.

* * * * *